US012271129B2

(12) United States Patent
Park et al.

(10) Patent No.: US 12,271,129 B2
(45) Date of Patent: Apr. 8, 2025

(54) INTERMEDIATE TRANSFER BELT ASSEMBLY WITH SHUTTER STRUCTURE

(71) Applicant: Hewlett-Packard Development Company, L.P., Spring, TX (US)

(72) Inventors: Seongho Park, Seongnam-si (KR); Wontaek Kim, Seongnam-si (KR)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 18/572,766

(22) PCT Filed: Dec. 27, 2021

(86) PCT No.: PCT/US2021/065229

§ 371 (c)(1),
(2) Date: Dec. 20, 2023

(87) PCT Pub. No.: WO2023/282930

PCT Pub. Date: Jan. 12, 2023

(65) Prior Publication Data

US 2024/0201618 A1 Jun. 20, 2024

(30) Foreign Application Priority Data

Jul. 5, 2021 (KR) ........................ 10-2021-0088069

(51) Int. Cl.
*G03G 15/16* (2006.01)

(52) U.S. Cl.
CPC . *G03G 15/1615* (2013.01); *G03G 2215/1623* (2013.01)

(58) Field of Classification Search
CPC ........... G03G 21/1647; G03G 15/0886; G03G 2221/1657; G03G 15/0872; G03G 2221/1684; G03G 2215/0692
See application file for complete search history.

(56) References Cited

U.S. PATENT DOCUMENTS

| | | | |
|---|---|---|---|
| 5,731,824 A | 3/1998 | Kneezel et al. | |
| 8,065,913 B2 | 11/2011 | McCracken et al. | |
| 2008/0050158 A1* | 2/2008 | Hatayama .............. | G03G 21/10 399/358 |
| 2014/0093282 A1 | 4/2014 | Miwa et al. | |
| 2015/0261138 A1 | 9/2015 | Nakano et al. | |
| 2020/0201204 A1 | 6/2020 | Kasukawa | |

FOREIGN PATENT DOCUMENTS

| | | |
|---|---|---|
| JP | 2005-107222 A | 4/2005 |
| JP | 2008-216278 A | 9/2008 |
| JP | 2008-281930 A | 11/2008 |
| JP | 2010-262063 A | 11/2010 |
| WO | 2013/064418 A1 | 5/2013 |
| WO | 2018/135846 A2 | 7/2018 |
| WO | 2020/190364 A1 | 9/2020 |

* cited by examiner

*Primary Examiner* — Jessica L Eley
(74) *Attorney, Agent, or Firm* — Foley & Lardner LLP

(57) ABSTRACT

An intermediate transfer belt assembly includes an intermediate transfer roller located on an inner side of an intermediate transfer belt to support the intermediate transfer belt, an accommodation portion to accommodate foreign matter, the accommodation portion having an inlet open toward the intermediate transfer belt, and a shutter to open or close the inlet.

15 Claims, 13 Drawing Sheets

INTERMEDIATE TRANSFER BELT ASSEMBLY WITH SHUTTER STRUCTURE

CROSS-REFERENCE TO RELATED APPLICATIONS

This application is a U.S. National Stage Patent Application under 35 U.S.C. § 371 of PCT/US2021/065229, filed Dec. 27, 2021, which claims priority to Korean Patent Application No. 10-2021-0088069, filed Jul. 5, 2021, which are hereby incorporated by reference in their entireties.

BACKGROUND

An electro-photographic image forming device may operate by forming a visible toner image on a photoconductor by supplying a toner accommodated in a developing device to an electrostatic latent image formed on the photoconductor, transfer the visible toner image onto a printing medium, and fuse the transferred toner image on the printing medium. In order to print a color image, toner images of different colors may be formed on a plurality of photoconductors. The plurality of photoconductors face a plurality of intermediate transfer rollers with an intermediate transfer belt interposed therebetween. The intermediate transfer belt may be supported by a plurality of support rollers and run along a circulation path. The toner images are transferred from the plurality of photoconductors to the printing medium via the intermediate transfer belt. The toner may leak from the developing device. The intermediate transfer belt or the intermediate transfer roller may be contaminated by the toner leaking from the developing device.

BRIEF DESCRIPTION OF THE DRAWINGS

Various examples will be described below by referring to the following figures.

FIGS. 5 to 7 are partial cross-sectional perspective views illustrating a positional relationship between a holder and a shutter, according to an example, wherein FIG. 5 illustrates a state in which the holder and the shutter are located in a pressed position and an open position, respectively, FIG. 6 illustrates a state in which the holder is located between a pressed position and a released position, and FIG. 7 illustrates a state in which the holder and the shutter are located in a released position and a closed position, respectively.

DETAILED DESCRIPTION

Figure 1:
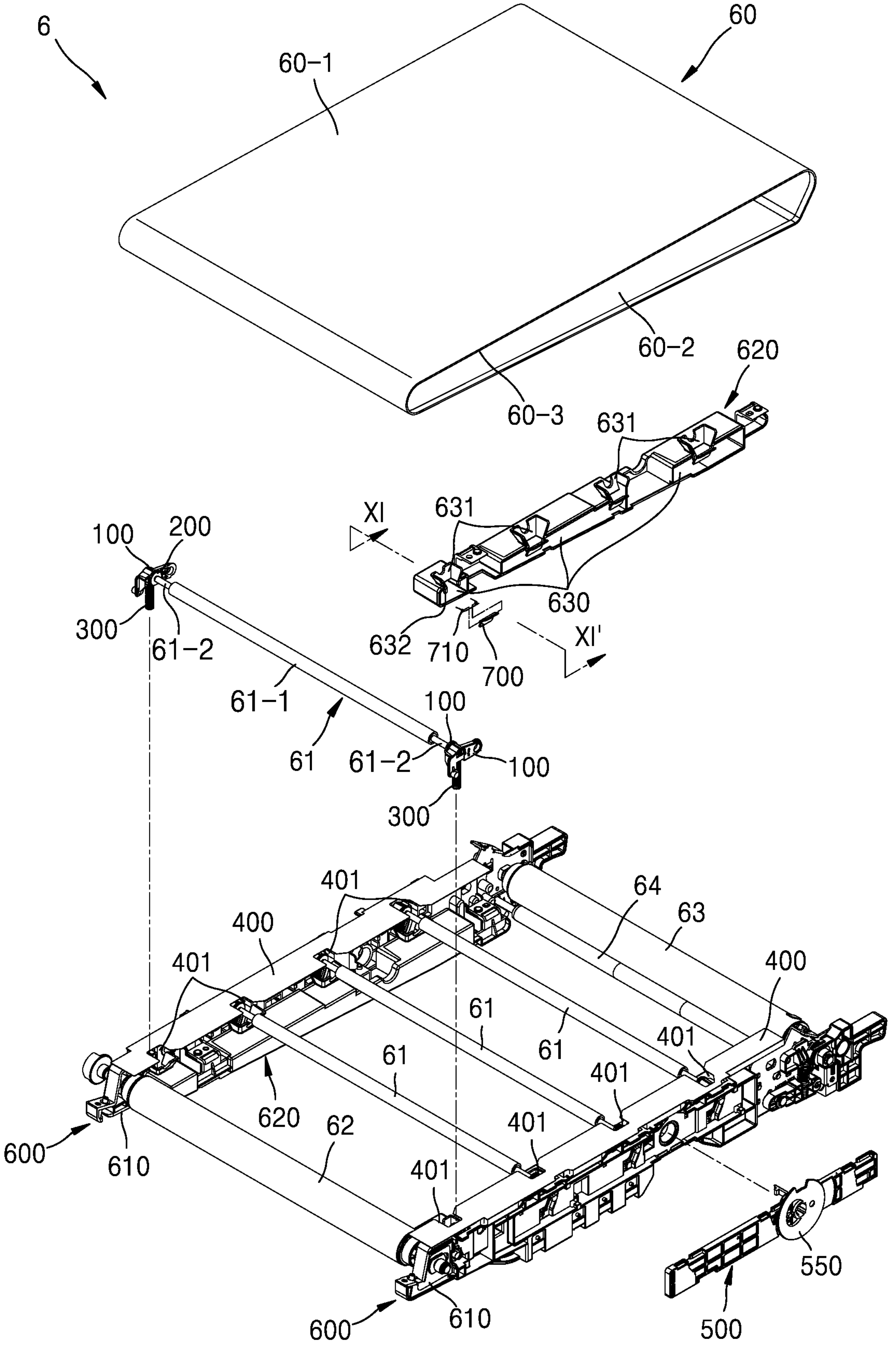
FIG. 1 is a partial exploded perspective view of an intermediate transfer belt assembly, according to an example.

In an electro-photographic image forming process, a foreign matter such as toner leaking from a developing device may contaminate an intermediate transfer belt and/or an intermediate transfer roller. An intermediate transfer belt assembly may be provided with an accommodation portion to accommodate the foreign matter leaking from the developing device. The intermediate transfer belt assembly may be separated from an image forming device body, such as for an after-sales service. In that case, the foreign matter such as the toner accommodated in the accommodation portion may leak from the accommodation portion.

An example intermediate transfer belt assembly includes an intermediate transfer belt, an intermediate transfer roller located on an inner side of the intermediate transfer belt to support the intermediate transfer belt, and an accommodation portion to accommodate foreign matter. A shutter may selectively open or close an inlet of the accommodation portion. For example, the intermediate transfer roller may move between a pressed position to press the intermediate transfer belt outward and a released position to release a pressing force, and the shutter may switch between an open position to open an inlet of the accommodation portion and a closed position to close the inlet of the accommodation portion in conjunction with a movement of the intermediate transfer roller to the pressed position or the released position. The shutter may be switched to the closed position in a case where the intermediate transfer roller moves to the released position, and may be switched to the open position by an elastic force of an elastic member in a case where the intermediate transfer roller moves to the pressed position. For example, the intermediate transfer belt assembly may include a holder to support an end portion of the intermediate transfer roller to be rotated. The holder may be installed in a frame to be rotatable between a pressed position and a released position. In a case where the intermediate transfer roller is supported by the holder and rotates from the pressed position to the released position, the holder may interfere with the shutter to switch the shutter to the closed position. The holder may be connected to a slider. The slider may be slid between a first position to locate the holder in the pressed position and a second position to locate the holder in the released position. The slider may be slid between the first position and the second position by a rotation cam. The intermediate transfer belt assembly may include a plurality of intermediate transfer rollers, a plurality of inlets, and a plurality of shutters respectively corresponding to the plurality of inlets. The intermediate transfer belt assembly may include the plurality of intermediate transfer rollers, the plurality of inlets, and the shutters to open or close the plurality of inlets.

In an example, the foreign matter such as the toner falling out of the developing device is accommodated in the accommodation portion through the inlets. Since the foreign matter such as the toner is accommodated in the accommodation portion without being scattered, contamination of the intermediate transfer belt and/or the intermediate transfer roller by the foreign matter such as the toner may be reduced or prevented. In addition, since the inlet of the accommodation portion is blocked by the shutter, the foreign matter may not leak from the accommodation portion even in a case where the intermediate transfer belt assembly is removed from the image forming device body. Hereinafter, examples of the intermediate transfer belt assembly and the image forming device will be described with reference to the accompanying drawings. In the description and the drawings, constituent elements having substantially the same functions are referenced by the same reference numerals, and thus, redundant descriptions thereof will be omitted.

Figure 2:
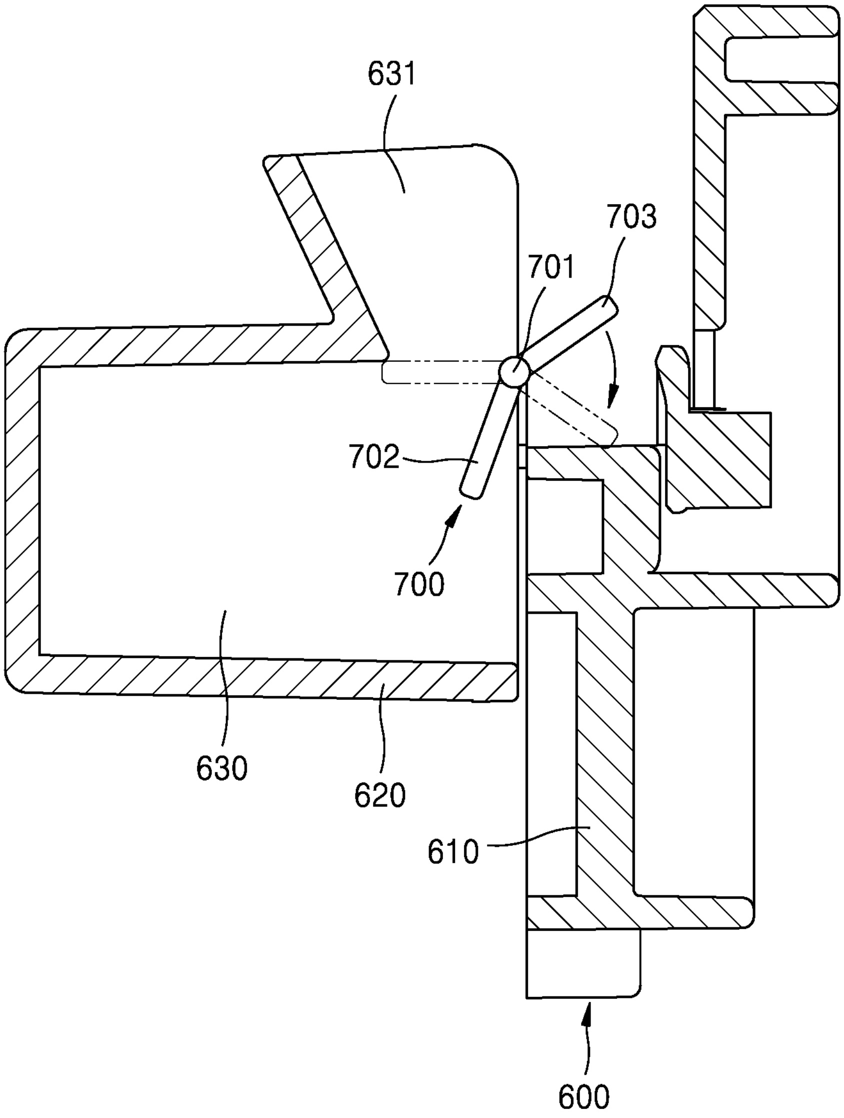
FIG. 2 is a cross-sectional view taken along a line X1-X1' of FIG. 1, according to an example.

FIG. 1 is a partial exploded perspective view of an intermediate transfer belt assembly, according to an example. FIG. 2 is a cross-sectional view taken along a line X1-X1' of FIG. 1, according to an example.

Referring to FIGS. 1 and 2, an intermediate transfer belt assembly 6 may include an intermediate transfer belt 60, an intermediate transfer roller 61 located on an inner side of the intermediate transfer belt 60 to support the intermediate transfer belt 60, an accommodation portion 630 having an inlet 631 open toward the intermediate transfer belt 60, wherein foreign matter is to be accommodated in the accommodation portion 630, and a shutter 700 to open or close the inlet 631. In examples illustrated in FIGS. 1 and 2, the intermediate transfer belt assembly 6 is provided with four intermediate transfer rollers 61. The accommodation portion 630 may be provided with four inlets 631 respectively corresponding to the four intermediate transfer rollers 61.

The intermediate transfer belt 60 is in the form of an endless belt running along a circular path, and may include a transfer region 60-1 and a non-transfer region 60-2 opposite thereto. The transfer region 60-1 is to face a photoconductor to be described later and is to receive a toner image formed on the photoconductor. The intermediate transfer belt 60 may be supported by a pair of support rollers 62 and 63 to run along a circulation path. For example, the support roller 62 may be a driving roller, and the support roller 63 may be a driven roller. A tension roller 64 is located near the support roller 63 and is to apply tension to the intermediate transfer belt 60. An elastic force to press the intermediate transfer belt 60 outward is applied to the tension roller 64 by an elastic member (not shown). A pair of frames 600 may be separated from each other in a width direction of the intermediate transfer belt 60, and the support rollers 62 and 63 and the tension roller 64 may be supported by the pair of frames 600 to rotate.

A plurality of intermediate transfer rollers 61, for example, the four intermediate transfer rollers 61, may be arranged in a running direction of the intermediate transfer belt 60. The plurality of intermediate transfer rollers 61 are located on the inner side of the intermediate transfer belt 60 to support the intermediate transfer belt 60. The plurality of intermediate transfer rollers 61 are located between the support rollers 62 and 63, and face the transfer region 60-1 of the intermediate transfer belt 60. The plurality of intermediate transfer rollers 61 are supported by the pair of frames 600 to rotate. The intermediate transfer roller 61 may include a roller portion 61-1 and a rotation shaft 61-2. Both end portions of the intermediate transfer roller 61 may be supported by the pair of frames 600 to rotate via holders 100. In an example, the holders 100 are inserted onto both end portions of the rotation shaft 61-2 of the intermediate transfer roller 61, respectively, and the holders 100 are supported by the pair of frames 600. The plurality of intermediate transfer rollers 61 may press the transfer region 60-1 of the intermediate transfer belt 60 outward. For example, the holder 100 may be supported by the frame 600 to rotate or ascend, and a spring 300 may apply an elastic force to the holder 100 such that the intermediate transfer roller 61 elastically pushes the intermediate transfer belt 60 outward.

Gap rings 200 are provided at both end portions of the intermediate transfer roller 61, respectively. The gap rings 200 are coupled to the rotation shafts 61-2 of the intermediate transfer roller 61 to rotate, for example. The gap rings 200 may have a disk shape. An outer circumference of the gap ring 200 may be circular. The gap ring 200 is to maintain an interval between the photoconductor to be described later and the intermediate transfer roller 61. For example, the outer circumference of the gap ring 200 may be in contact with the photoconductor.

The accommodation portion 630 may be provided in the pair of frames 600, respectively. For example, the frames 600 may include a support member 610 to support the intermediate transfer roller 61 to rotate, and an accommodation member 620 to form the accommodation portion 630. For example, the accommodation member 620 may have a shape with an open wall facing the support member 610. The accommodation member 620 may be coupled to the support member 610 such that the open wall faces the support member 610. The support member 610 may block the open wall of the accommodation member 620, and the accommodation portion 630 may be implemented by the accommodation member 620 and the support member 610. Although not shown, a structure in which the accommodation member 620 forms the accommodation portion 630 may be employed.

The accommodation portion 630 is located below the gap ring 200 to form an accommodation space to accommodate foreign matter. The accommodation portion 630 is provided with the inlet 631. According to an example, the accommodation portion 630 includes the four inlets 631 respectively corresponding to the four intermediate transfer rollers 61. Although not shown in the drawings, four accommodation portions respectively corresponding to the four intermediate transfer rollers 61 may be provided, or two accommodation portions respectively corresponding to two intermediate transfer rollers 61 may be provided. The gap ring 200 may be located in a vertical projection area of the inlet 631. The inlet 631 communicates with the accommodation space formed by the accommodation portion 630. Foreign matter such as toner may enter the accommodation portion 630 through the inlet 631. The inlet 631 may have a funnel shape in which a cross-sectional area decreases toward the accommodation portion 630. Given such a configuration, falling foreign matter such as the toner may pass through the inlet 631 to be accommodated in the accommodation portion 630, and the foreign matter such as the toner accommodated in the accommodation portion 630 may remain in the accommodation portion 630 based on the shape of the inlet 631.

In an example, the intermediate transfer belt assembly 6 may further include sealing covers 400. The sealing covers 400 may cover both end portions of the intermediate transfer roller 61. For example, the sealing covers 400 may be coupled to the pair of support members 610, respectively, to cover both end portions of the intermediate transfer roller 61. An opening 401 to expose the gap ring 200 may be provided in the sealing cover 400. In the example of FIGS. 1 and 2, four openings 401 are provided to correspond to the gap rings 200 of the four intermediate transfer rollers 61, respectively. The gap ring 200 may be exposed through the opening 401 to contact the photoconductor to be described later. The four inlets 631 of the accommodation portion 630 are located below the four openings 401 of the sealing covers 400, respectively, and are vertically aligned with the four openings 401 of the sealing covers 400. The sealing cover 400 may partially cover the intermediate transfer belt 60. The sealing cover 400 may cover an edge 60-3 of the intermediate transfer belt 60 in the width direction. By the sealing cover 400, foreign matter such as toner may be prevented from entering the inside of the intermediate transfer belt assembly 6, for example, the inside of the intermediate transfer belt 60.

The shutter 700 is to open or close the inlet 631 of the accommodation portion 630. For example, the shutter 700 may be switched between an open position (shown by a solid line in FIG. 2) to open the inlet 631 of the accommodation portion 630 and a closed position (shown by a dotted line in FIG. 2) to close the inlet 631 of the accommodation portion 630. The shutter 700 may be supported by the accommodation member 620 to rotate between the open position and the closed position. The shutter 700 may include a rotation shaft 701 supported by the accommodation member 620, and an opening/closing portion 702 extending from the rotation shaft 701 to open or close the inlet 631. The inlet 631 of the accommodation portion 630 is provided with a shaft support 632 into which the rotation shaft 701 is inserted. The intermediate transfer belt assembly 6 may include an elastic member 710 to provide the shutter 700 with an elastic force in a direction in which the shutter 700 is switched to the open position. The elastic member 710 may be implemented by, for example, a torsion coil spring including a winding portion inserted into the rotation shaft 701, and a first arm and a second arm extending from the winding portion and respectively supported by the accommodation member 620 and the shutter 700. The shutter 700 may be switched between the open position and the closed position by a switching structure (not shown). The switching structure may rotate the shutter 700 in a direction opposite to the elastic force of the elastic member 710 to switch the shutter 700 between the open position and the closed position. In a case where a connection between the shutter 700 and the switching structure is released, the shutter 700 may be returned from the closed position to the open position by the elastic force of the elastic member 710.

In an electro-photographic image forming process, an electrostatic latent image formed on the photoconductor is developed into a visible toner image by a toner supplied from a developing device. The toner image is transferred from the photoconductor onto the intermediate transfer belt 60. The developing device accommodates the toner therein, and forms a toner layer on an outer circumference of a developing roller. The developing roller is partially exposed to the outside of a housing of the developing device through a developing opening provided in the housing of the developing device. An exposed outer circumferential portion of the developing roller faces the photoconductor, and the toner is supplied from the developing roller to the electrostatic latent image on the photoconductor by a developing bias voltage applied to the developing roller. A gap between the developing roller and the developing opening is sealed by a sealing structure (not shown). Sealing between an end portion of the developing roller in a longitudinal direction and an end portion of the developing opening may inadvertently allow toner or other foreign matter to leak. Therefore, the toner may leak out through an end portion of the developing roller in the longitudinal direction. The end portion of the developing roller in the longitudinal direction is located outside an effective image area. The toner leaking from the developing device mainly falls to a vicinity of the gap ring 200.

The toner leaking from the developing device may be scattered while the intermediate transfer roller 61 rotates, and may contaminate the roller portion 61-1 of the intermediate transfer roller 61 and the intermediate transfer belt 60. An intermediate transfer bias voltage to transfer the toner image of the photoconductor onto the intermediate transfer belt 60 is applied to the intermediate transfer roller 61. An intermediate transfer electric-field is formed between the photoconductor and the intermediate transfer roller 61 by the intermediate transfer bias voltage. In a case where the roller portion 61-1 of the intermediate transfer roller 61 and the intermediate transfer belt 60 are contaminated, an electrical resistance of the roller portion 61-1 of the intermediate transfer roller 61 and the intermediate transfer belt 60 may change, and accordingly, the intermediate transfer electric-field may be distorted. In that case, a transfer quality of the toner image from the photoconductor to an intermediate transfer belt may deteriorate. Distortion of the intermediate transfer electric-field due to the contamination of the roller portion 61-1 of the intermediate transfer roller 61 and the intermediate transfer belt 60 may increase in a high-temperature and high-humidity environment.

In an example, the intermediate transfer belt assembly 6 is provided with the accommodation portion 630 to accommodate foreign matter such as toner. The inlet 631 of the accommodation portion 630 may be located in a lower portion of the gap ring 200 (e.g., below the gap ring 200). The foreign matter such as toner falling out of the developing device may pass through the inlet 631 to be accommodated in the accommodation space in the accommodation portion 630. Therefore, the contamination of the intermediate transfer roller 61 and the intermediate transfer belt 60 due to scattering of the leaking toner may be decreased, and the deterioration of the transfer quality may be reduced or prevented. The inlet 631 of the accommodation portion 630 may be opened or closed by the shutter 700. For example, in a case where an image forming operation is not performed, the shutter 700 may be located in the closed position, and the foreign matter such as the toner accommodated in the accommodation portion 630 may be prevented from leaking out of the accommodation portion 630. In addition, the shutter 700 may be located in the closed position in a case where the intermediate transfer belt assembly 6 is removed from an image forming device body, and the foreign matter such as the toner accommodated in the accommodation portion 630 may be prevented from leaking out of the accommodation portion 630 in a process of handling the intermediate transfer belt assembly 6 for an after-sales service and the like.

The intermediate transfer roller 61 may move between a pressed position to press the intermediate transfer belt 60 outward and a released position to release a pressing force. The pressed position may be, for example, a position in which an intermediate transfer nip is formed between the intermediate transfer belt 60 and the photoconductor to be described later by pressing the intermediate transfer belt 60 toward the photoconductor. The released position may be a position in which the intermediate transfer nip is released. In the pressed position, the intermediate transfer roller 61 may be in contact with an inner surface of the intermediate transfer belt 60. In the released position, the intermediate transfer roller 61 may be separated away from the inner surface of the intermediate transfer belt 60.

The shutter 700 may move between the open position and the closed position in conjunction with a movement of an intermediate transfer roller between the pressed position and the released position.

Figure 3:
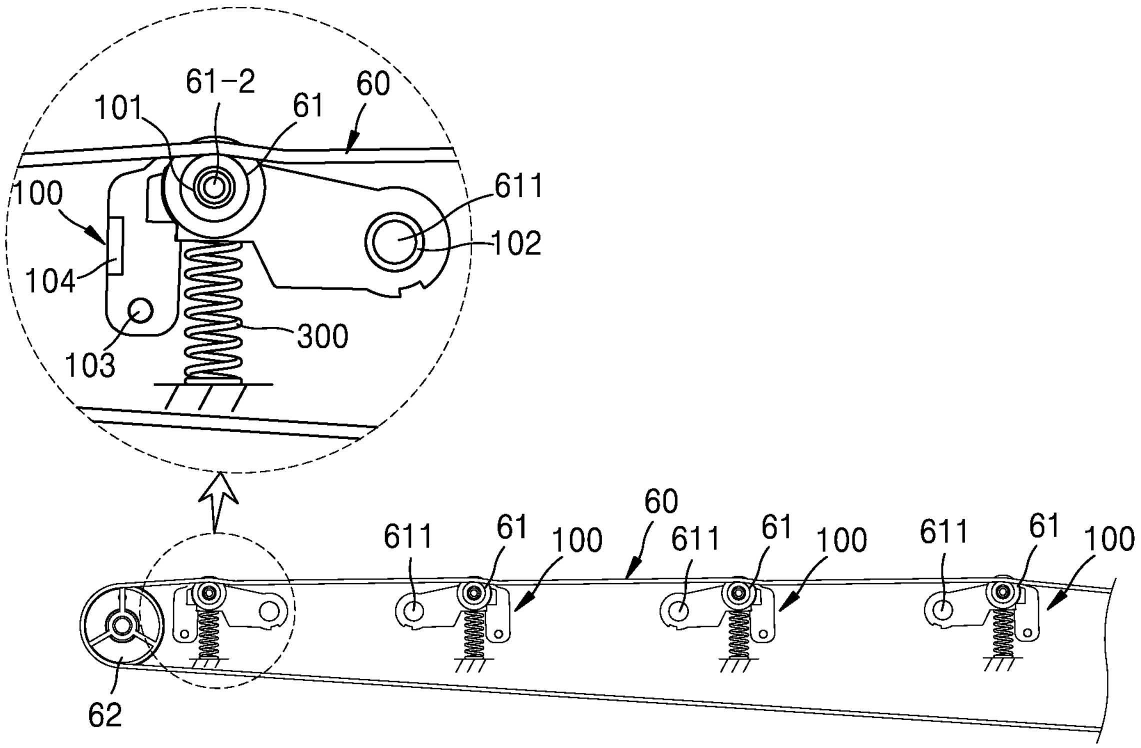
FIG. 3 is a diagram illustrating a positional movement structure of an intermediate transfer roller and a state in which the intermediate transfer roller is located in a pressed position, according to an example.
Figure 4:
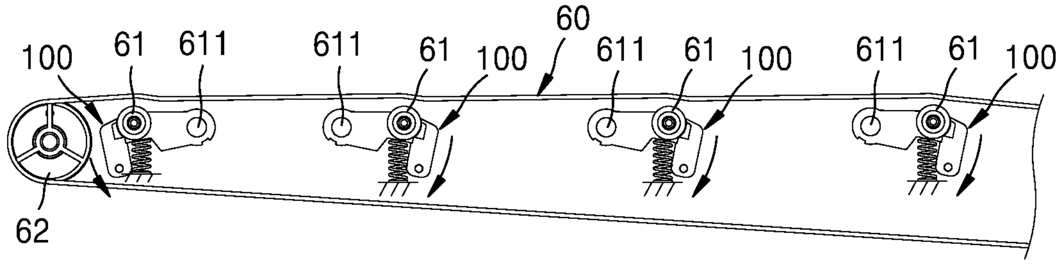
FIG. 4 is a diagram illustrating a positional movement structure of an intermediate transfer roller and a state in which the intermediate transfer roller is located in a released position, according to an example.

FIG. 3 is a diagram illustrating a positional movement structure of an intermediate transfer roller and a state in which the intermediate transfer roller is located in a pressed position, according to an example. FIG. 4 is a diagram illustrating a positional movement structure of an intermediate transfer roller and a state in which the intermediate transfer roller is located in a released position, according to an example. With respect to FIGS. 3 and 4, the frame 600 is omitted.

Referring to FIGS. 3 and 4, the intermediate transfer roller 61 may be supported by the holder 100 to rotate, and the holder 100 may be supported by the frame 600, for example, the support member 610 to be able to rotate between the pressed position and the released position. For example, the holder 100 may include a support hole 101 and a center hole 102. The rotation shaft 61-2 of the intermediate transfer roller 61 may be inserted into the support hole 101. The support member 610 may be provided with a shaft 611. The holder 100 may be coupled to the support member 610 such that the shaft 611 may be inserted into the center hole 102 of the holder 100. The holder 100 may rotate about the shaft 611 to be switched between the pressed position and the released position. The spring 300 may apply an elastic force to the holder 100 such that the holder 100 rotates to the pressed position.

The holder 100 may interfere with the shutter 700 while rotating between the pressed position and the released position to switch the shutter 700 between an open position and a closed position. In a case where the holder 100 rotates between the released position and the pressed position, the shutter 700 may be returned from the closed position to the open position by an elastic force of the elastic member 710.

Figure 5:
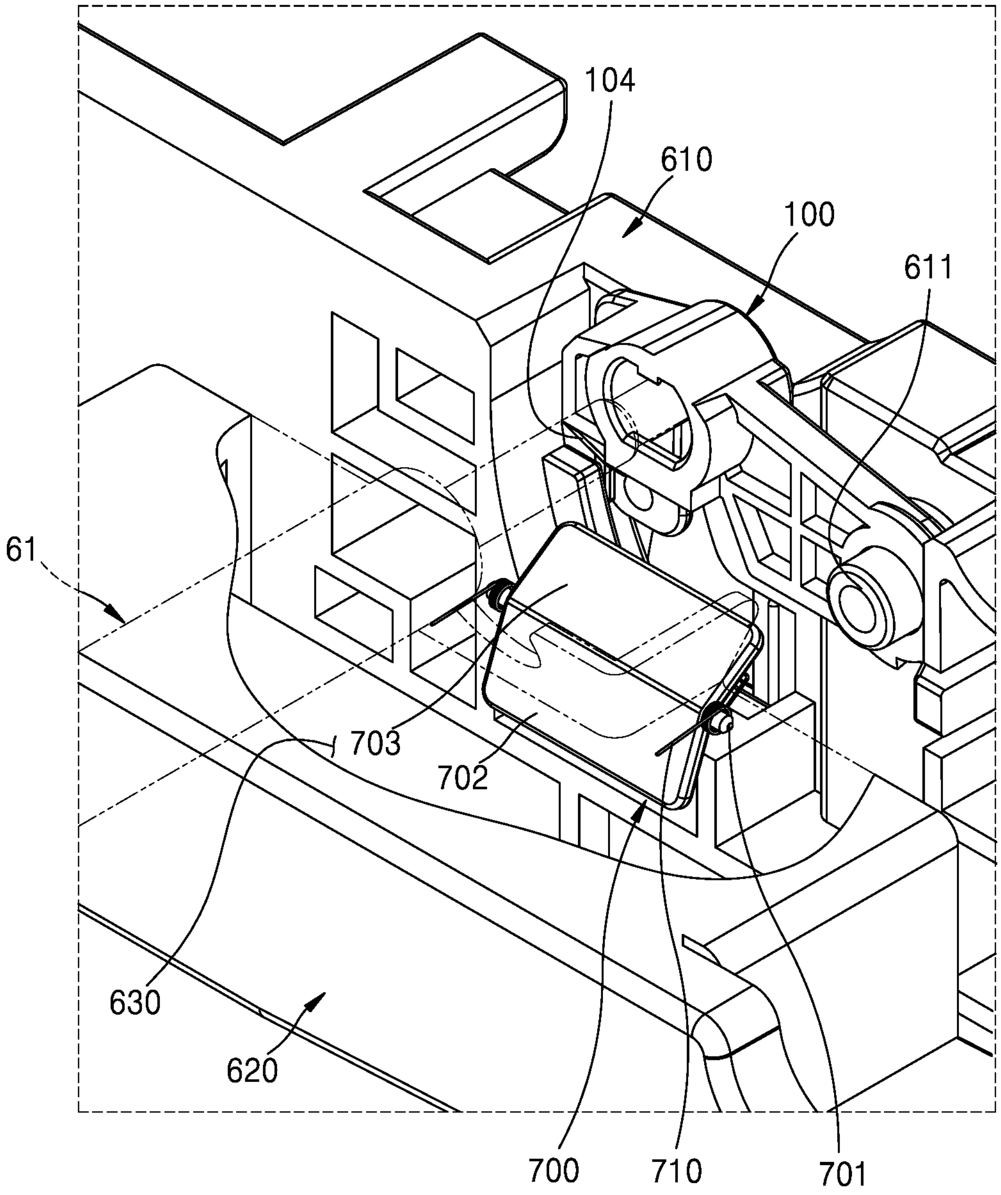
Figure 6:
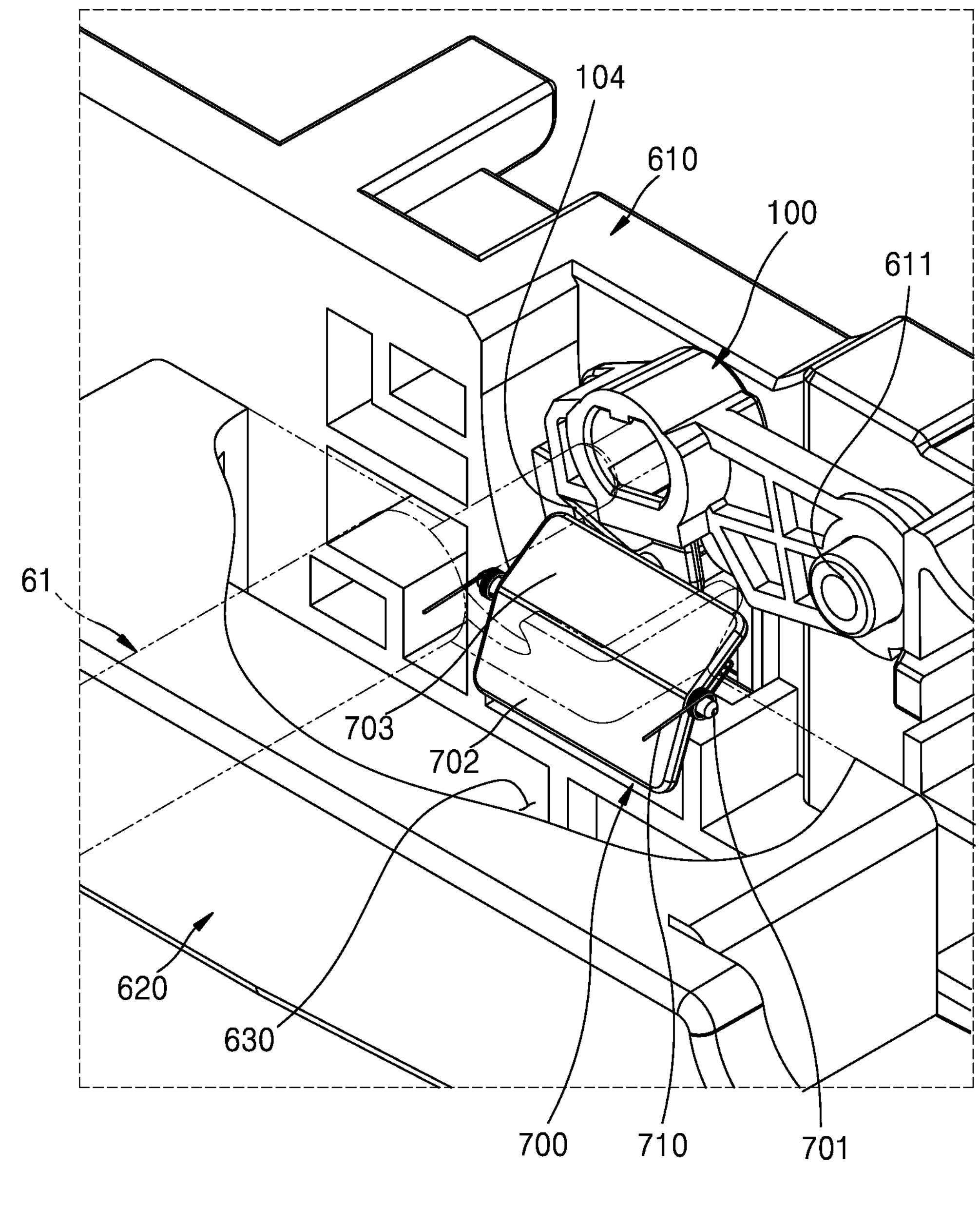
Figure 7:
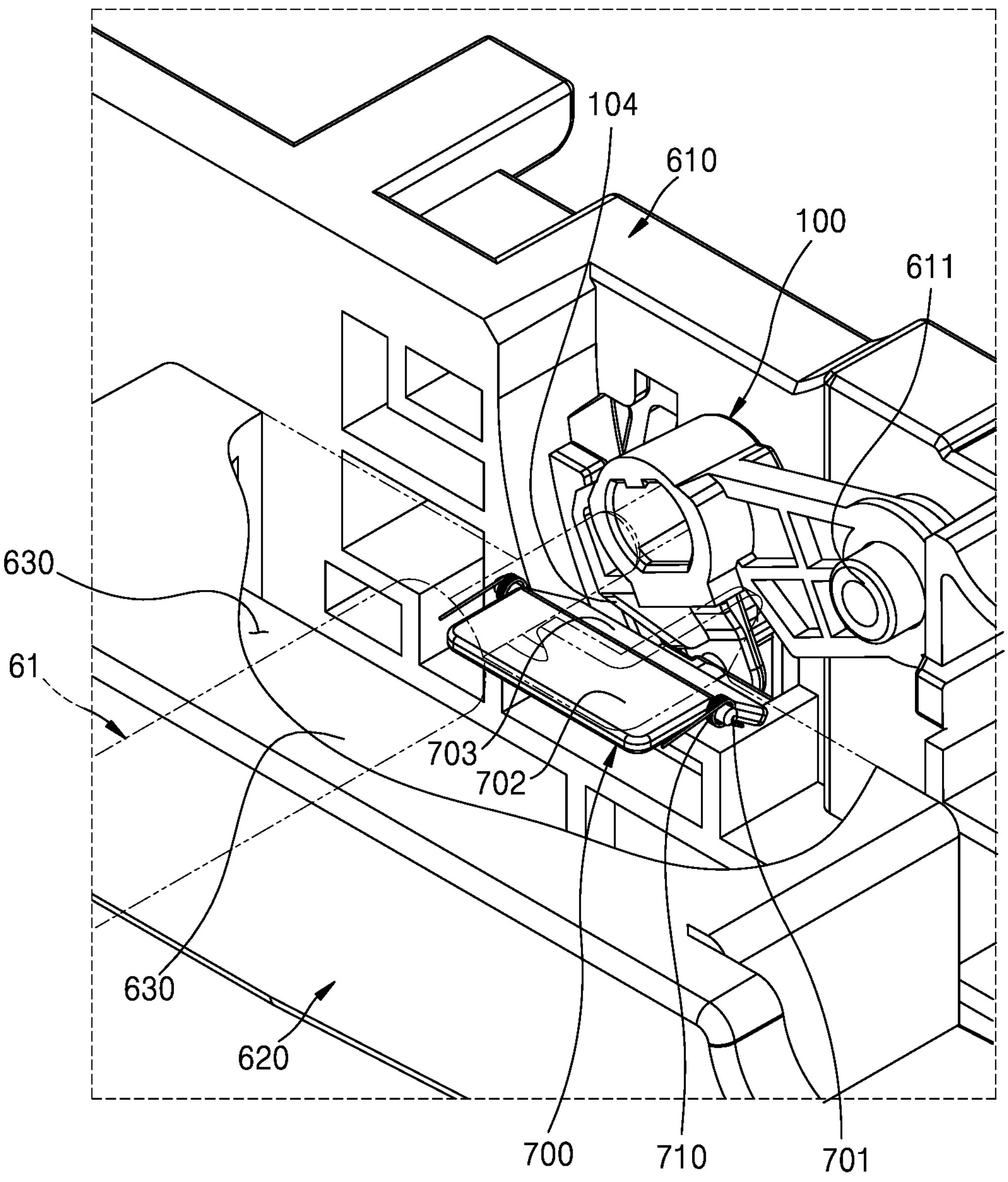

FIGS. 5 to 7 are partial cross-sectional perspective views illustrating a positional relationship between a holder and a shutter, according to an example, wherein FIG. 5 illustrates a state in which the holder and the shutter are located in a pressed position and an open position, respectively, FIG. 6 illustrates a state in which the holder is located between a pressed position and a released position, and FIG. 7 illustrates a state in which the holder and the shutter are located in a released position and a closed position, respectively. With respect to FIGS. 5 to 7, the intermediate transfer belt 60 is omitted.

Referring to FIG. 5, the holder 100 and the intermediate transfer roller 61 are located in the pressed position. In that state, as illustrated in FIG. 3, the intermediate transfer roller 61 may press an outer circumferential surface of the intermediate transfer belt 60 outward. As will be described later, in a case where the intermediate transfer roller 61 is located in the pressed position, an intermediate transfer nip is formed between the intermediate transfer belt 60 and a photoconductor. An interference portion 104 of the holder 100 does not interfere with an interference plate 703 of the shutter 700. The shutter 700 is maintained in the open position to open the inlet 631 of the accommodation portion 630 through an elastic force of the elastic member 710. In that state, a print operation may be performed, and foreign matter such as toner falling out of a developing device during the print operation may pass through the inlet 631 to be accommodated in the accommodation portion 630.

In a case where the print operation is not performed, the intermediate transfer roller 61 and the holder 100 may rotate to the released position. For example, the holder 100 may rotate to the released position about the shaft 611 by a driving device (not shown). The intermediate transfer roller 61 may move in a direction away from the intermediate transfer belt 60. A pressing force applied to the intermediate transfer belt 60 may be released and the intermediate transfer nip may be released. In a case where the holder 100 moves to the released position to some extent, the interference portion 104 of the holder 100 may interfere with the interference plate 703 of the shutter 700 as shown in FIG. 6. In a case where the holder 100 further rotates toward the released position in that state, the interference portion 104 may press the interference plate 703 to rotate the shutter 700 in a direction opposite to the elastic force of the elastic member 710. The shutter 700 may begin to rotate from the open position to a closed position.

As shown in FIG. 7, in a case where the holder 100 reaches the released position, the shutter 700 may reach the closed position to block the inlet 631 of the accommodation portion 630. Since the interference portion 104 of the holder 100 located in the released position presses the interference plate 703 of the shutter 700, the shutter 700 may be maintained in the closed position. In a case where the print operation is to be performed again, the holder 100 may rotate about the shaft 611 between the released position and the pressed position The interference portion 104 of the holder 100 may move away from the interference plate 703 of the shutter 700, and the shutter 700 may rotate to the open position through the elastic force of the elastic member 710. In a case where the holder 100 and the intermediate transfer roller 61 reach the pressed position as shown in FIG. 6, the shutter 700 may reach the open position to be maintained in the open position by the elastic force of the elastic member 710.

Movements of the intermediate transfer roller 61 between the pressed position and the released position may be implemented by various structures. As an example, the movements of the intermediate transfer roller 61 between the pressed position and the released position may be implemented by a slider-cam structure.

Figure 8:
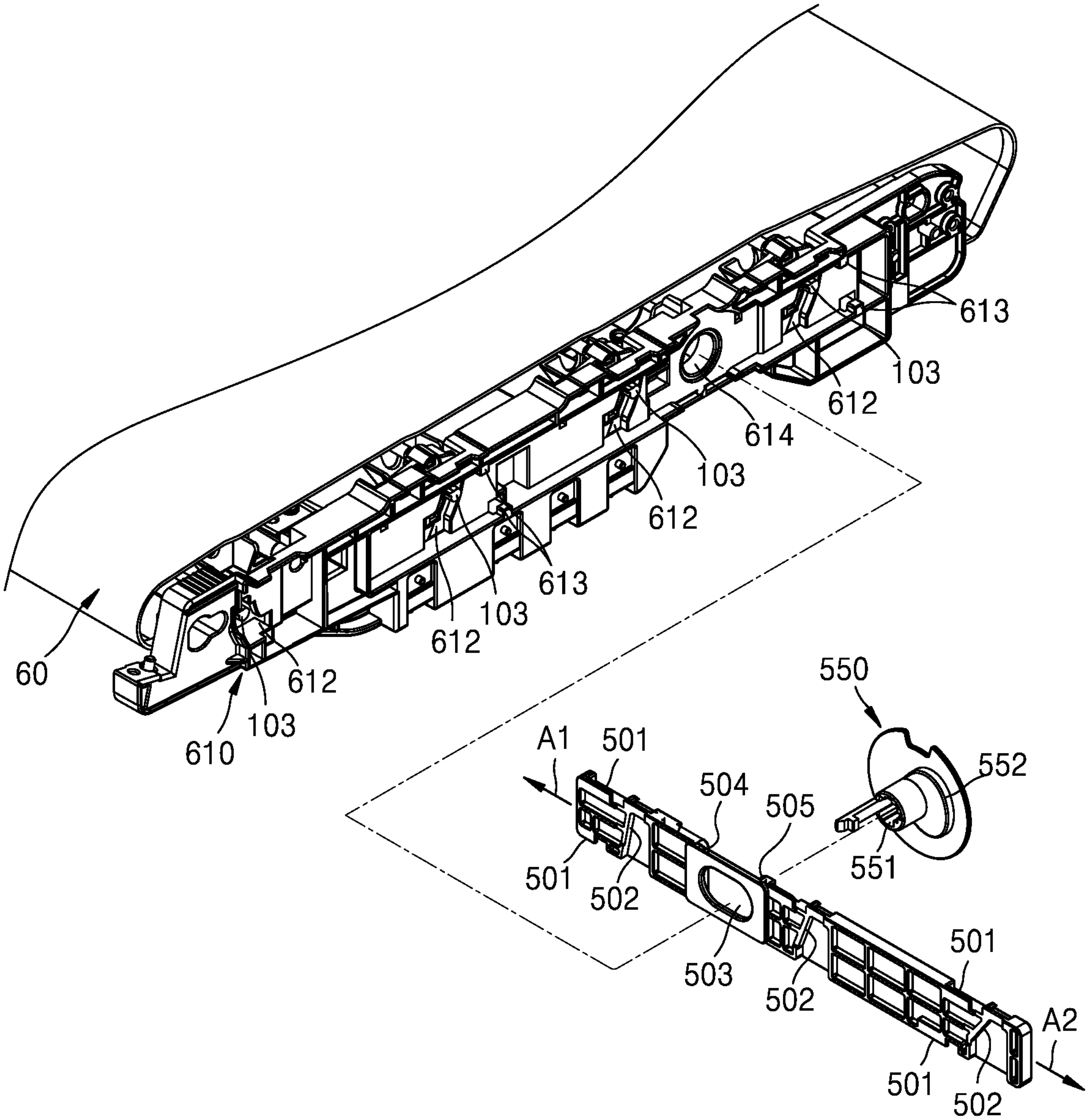
FIG. 8 is an exploded perspective view of a slider-cam structure, according to an example.
Figure 9:
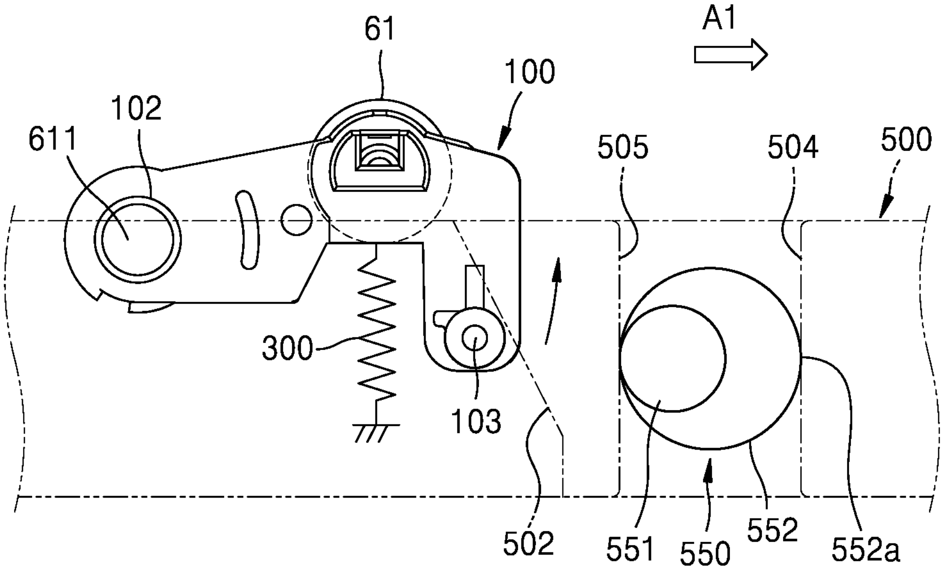
FIG. 9 illustrates a state in which a holder and a slider are located in a pressed position and a first position, respectively, in an example of the slider-cam structure illustrated in FIG. 8.
Figure 10:
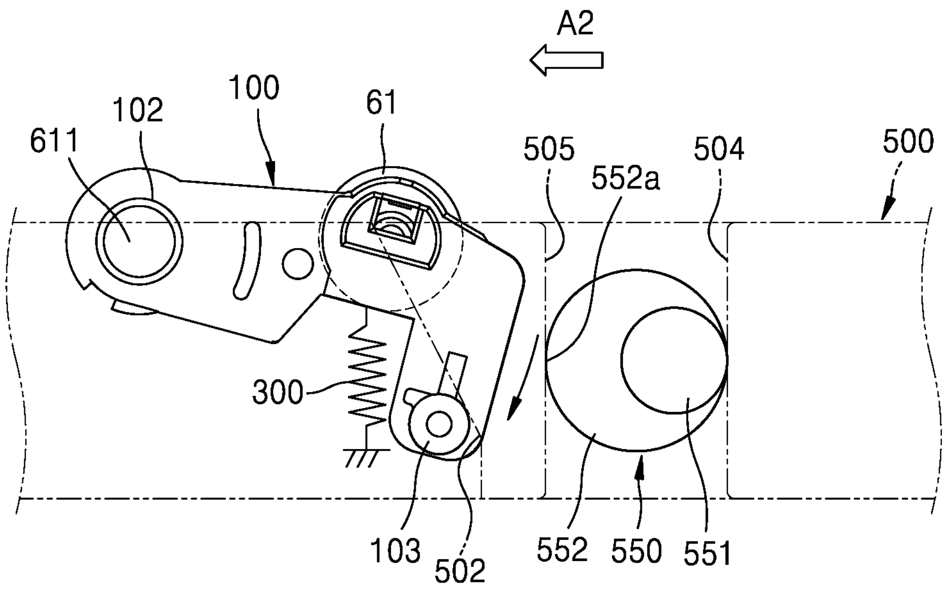
FIG. 10 illustrates a state in which a holder and a slider are located in a released position and a second position, respectively, in an example of the slider-cam structure illustrated in FIG. 8.

FIG. 8 is an exploded perspective view of a slider-cam structure, according to an example. FIG. 9 illustrates a state in which a holder and a slider are located in a pressed position and a first position, respectively, in an example of the slider-cam structure shown in FIG. 8. FIG. 10 illustrates a state in which a holder and a slider are located in a released position and a second position, respectively, in an example of the slider-cam structure shown in FIG. 8.

Referring to FIGS. 8 to 10, the slider-cam structure may include a slider 500 connected to the holder 100 and supported by the frame 600 to be able to slide between the first position to locate the holder 100 to the pressed position and the second position to locate the holder 100 to the released position, and a rotation cam 550 to slide the slider 500 between the first position and the second position.

In a case where the holder 100 is located inside the support member 610, a guide protrusion 103 of the holder 100 may protrude outward through a slot 612 provided in the support member 610. The slider 500 may be supported by the frame 600, for example, the support member 610 to slide. For example, the slider 500 may be provided with a rail 501 extending in a sliding direction, and the support member 610 may be provided with a hook 613 on which the rail 501 may be caught to allow the rail 501 to slide in A1 and A2 directions. The A1 and A2 directions may be, for example, running directions of the intermediate transfer belt 60. A push portion 502 to engage with the guide protrusion 103 of the holder 100 may be provided on a surface opposite to the support member 610 of the slider 500. The push portion 502 may be, for example, a surface inclined with respect to a sliding direction of the slider 500. In a case where the slider 500 is coupled to the support member 610, the guide protrusion 103 of the holder 100 may face the push portion 502. The rotation cam 550 may pass through a through hole 503 provided in the slider 500 and may be inserted into a driving hole 614 of the support member 610. A driving shaft (not shown) may be provided in the driving hole 614. The rotation cam 550 may be provided with a coupling hole 551 to which the driving shaft may be coupled, and an eccentric cam 552 having an eccentric shape with respect to a center of the coupling hole 551. The slider 500 may be provided with first and second opposed portions 504 and 505 facing the eccentric cam 552. While the rotation cam 550 rotates, the eccentric cam 552 may push the first and second opposed portions 504 and 505 to slide the slider 500 in the A1 direction or the A2 direction.

Referring to FIG. 9, the slider 500 may be located in the first position. A maximum radius portion 552*a* of the eccentric cam 552 may face the first opposed portion 504. In this orientation, the push portion 502 of the slider 500 does not interfere with the guide protrusion 103 of the holder 100. The holder 100 may be maintained in the pressed position by an elastic force of the spring 300. In a case where the rotation cam 550 rotates in that state, the maximum radius portion 552*a* of the eccentric cam 552 may be separated from the first opposed portion 504. The eccentric cam 552 may push the second opposed portion 505 in the A2 direction, and the slider 500 may slide in the A2 direction. The push portion 502 of the slider 500 may press the guide protrusion 103 of the holder 100 to rotate the holder 100 in a direction opposite to the elastic force of the spring 300 with respect to the shaft 611 of the support member 610. In a case where the rotation cam 550 rotates, for example, 180 degrees, as shown in FIG. 10, the maximum radius portion 552*a* of the eccentric cam 552 may face the second opposed portion 505, and the slider 500 may reach the second position. The holder 100 may reach the released position. Since the guide protrusion 103 of the holder 100 may be pressed by the push portion 502 of the slider 500, the holder 100 may be maintained in the released position.

In order to rotate the holder 100 to the pressed position, the rotation cam 550 may rotate counterclockwise from a state shown in FIG. 10. The maximum radius portion 552*a* of the eccentric cam 552 may be separated from the second opposed portion 505. The eccentric cam 552 may push the first opposed portion 504 in the A1 direction, and the slider 500 may slide in the A1 direction. As the push portion 502 of the slider 500 is separated from the guide protrusion 103 of the holder 100, the holder 100 may rotate about the shaft 611 of the support member 610 through the elastic force of the spring 300. In a case where the rotation cam 550 rotates, for example, 180 degrees, as shown in FIG. 9, the maximum radius portion 552*a* of the eccentric cam 552 may face the first opposed portion 504, and the slider 500 may reach the first position. The holder 100 may reach the pressed position. The holder 100 may be maintained in the pressed position by the elastic force of the spring 300.

According to an example of the intermediate transfer belt assembly 6 described above, four shutters 700 are provided in the four inlets 631 provided in the accommodation portion 630, respectively. The plurality of inlets 631 and the plurality of shutters 700 may be combined in various ways.

Figure 11:
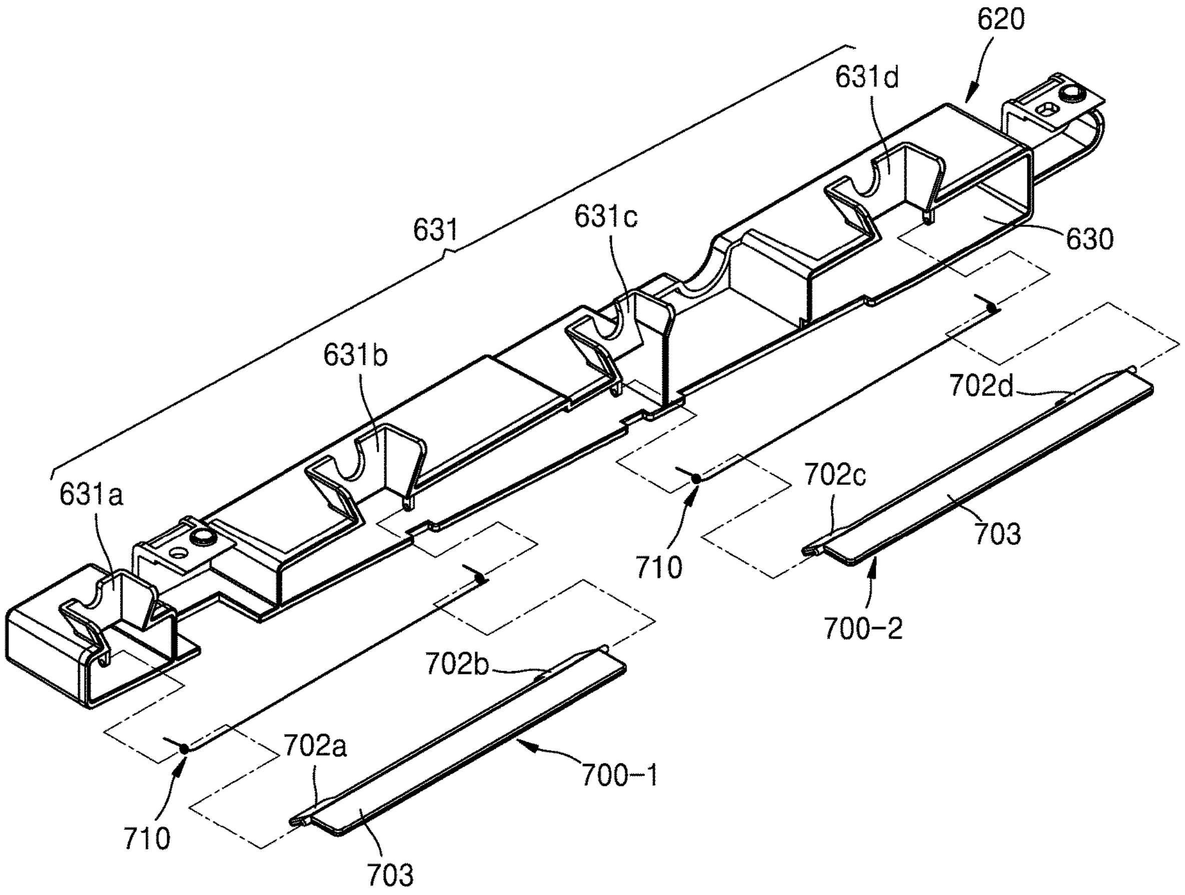
FIGS. 11 and 12 illustrate various examples of a shutter.
Figure 12:
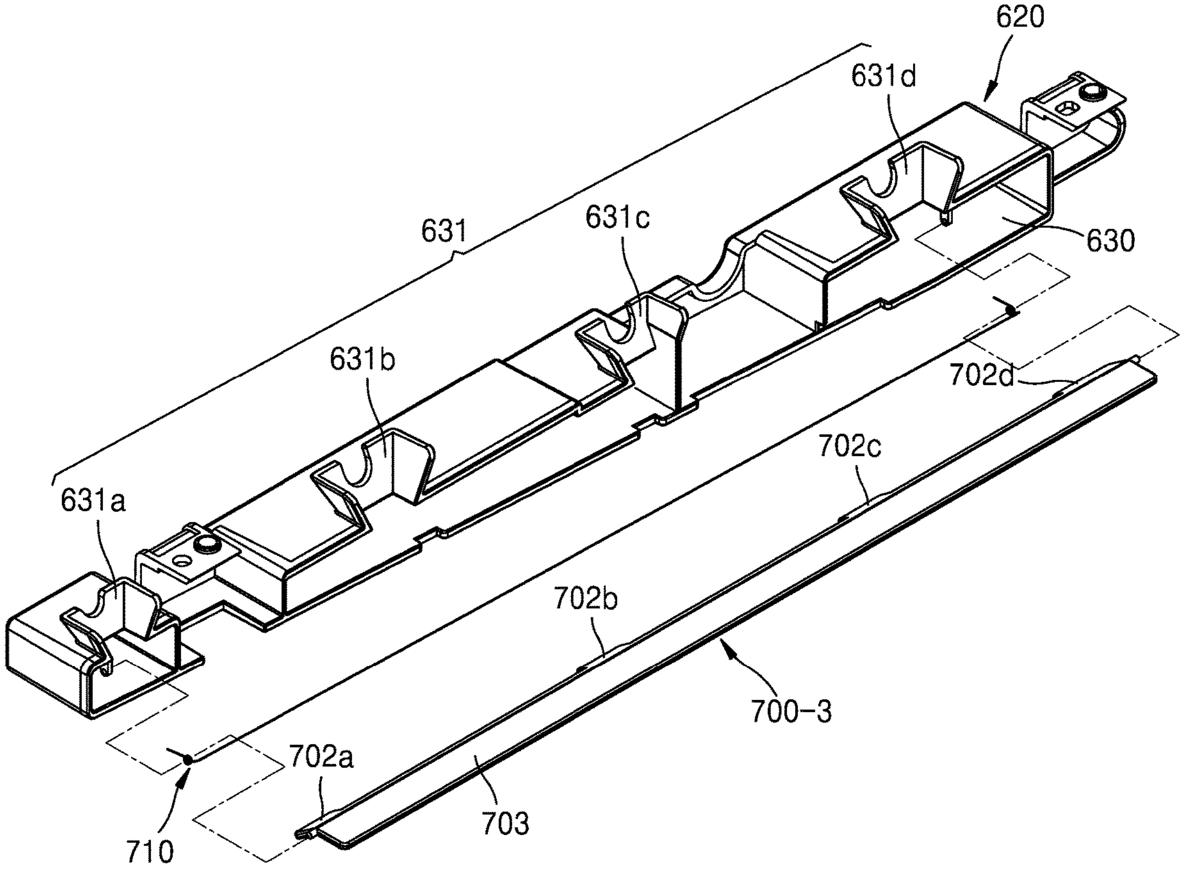

FIGS. 11 and 12 illustrate various examples of a shutter.

Referring to FIG. 11, the accommodation portion 630 may be provided with four inlets 631*a*, 631*b*, 631*c*, and 631*d*. The shutter 700 may be implemented by a first shutter 700-1 and a second shutter 700-2. The first shutter 700-1 may be provided with opening and closing portions 702*a* and 702*b* corresponding to the inlets 631*a* and 631*b*, respectively. The second shutter 700-2 may be provided with opening and closing portions 702*c* and 702*d* corresponding to the inlets 631*c* and 631*d*, respectively. Referring to FIG. 12, a shutter 700-3 may be employed, wherein the shutter 700-3 may be provided with the four opening and closing portions 702*a*, 702*b*, 702*c*, and 702*d* corresponding to the four inlets 631*a*, 631*b*, 631*c*, and 631*d*, respectively. In addition to such combinations, other various combinations are possible.

Figure 13:
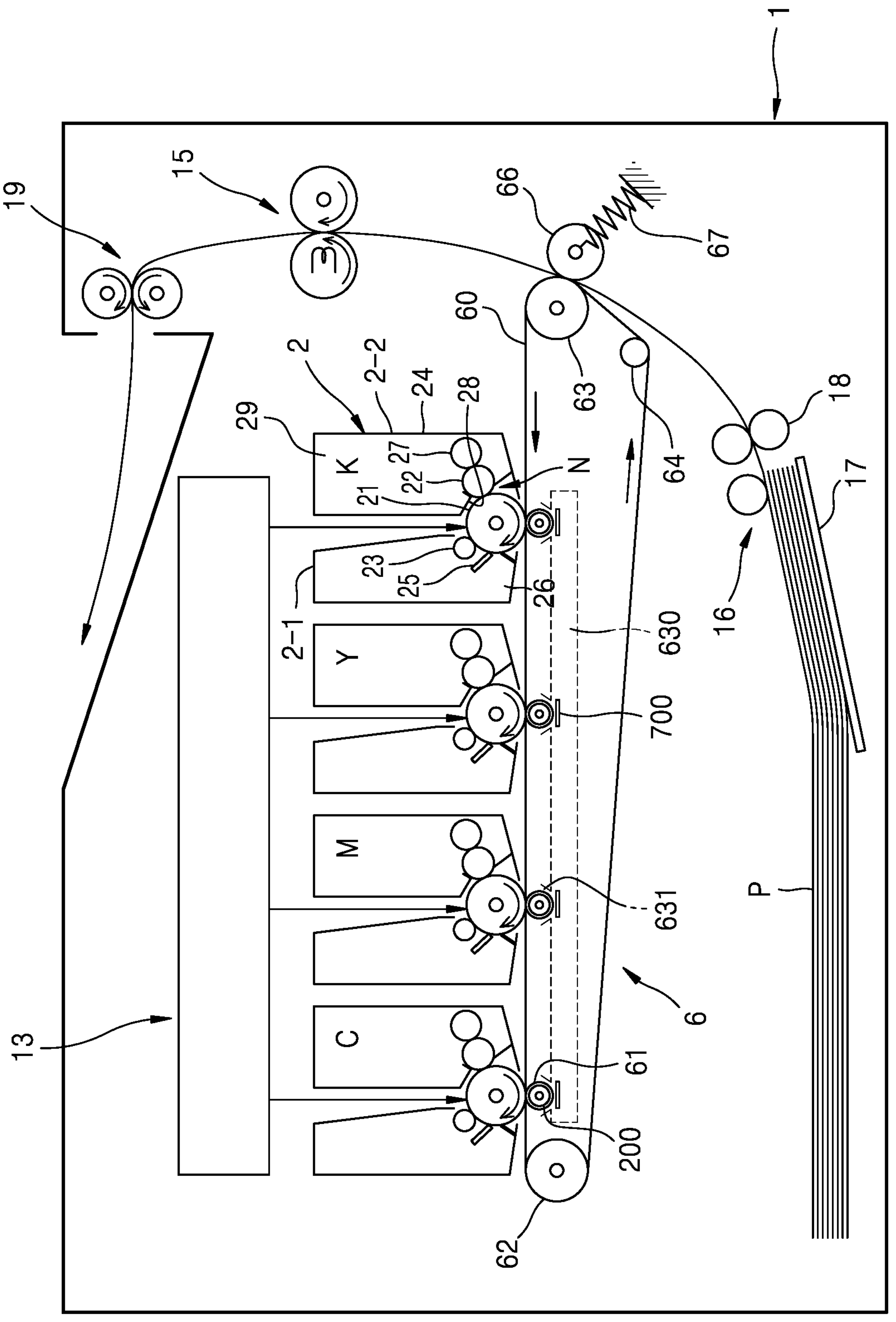
FIG. 13 is a schematic diagram of an electro-photographic image forming device, according to an example.

FIG. 13 is a schematic diagram of an electro-photographic image forming device, according to an example. An image forming device according to the example of FIG. 13 prints a color image on a printing medium P in an electro-photographic method. However, the example of FIG. 13 should not be considered limiting.

Referring to FIG. 13, the image forming device may include a plurality of photosensitive drums 21 on which toner images may be formed, the intermediate transfer belt 60 onto which the toner images may be transferred, the plurality of intermediate transfer rollers 61 facing the plurality of photosensitive drums 21 with the intermediate transfer belt 60 interposed therebetween, a plurality of gap rings 200 coupled to end portions of the plurality of intermediate transfer rollers 61 to maintain an interval between the plurality of photosensitive drums 21 and the plurality of intermediate transfer rollers 61, the frame 600 including the accommodation portion 630 having the plurality of inlets 631 located in lower portions of the plurality of gap rings 200, wherein foreign matter may be accommodated in the accommodation portion 630 and supporting the plurality of intermediate transfer rollers 61 to rotate, and the shutter 700 to open or close the plurality of inlets 631.

The image forming device includes the intermediate transfer belt assembly 6. A structure of the intermediate transfer belt assembly 6 is the same as the descriptions given in FIGS. 1 to 12. Referring to FIGS. 1 to 13, an example of the image forming device may include the plurality of photosensitive drums (photoconductors) 21 on which the toner images may be formed, the intermediate transfer belt 60 onto which the toner images may be transferred, the plurality of intermediate transfer rollers 61 facing the plurality of photosensitive drums 21 with the intermediate transfer belt 60 interposed therebetween, the plurality of gap rings 200 arranged at both end portions of the plurality of intermediate transfer rollers 61 to regulate the interval between the plurality of intermediate transfer rollers 61 and the plurality of photosensitive drums 21, and the accommodation portion 630 located in the lower portions of the plurality of gap rings 200 (i.e., below the plurality of gap rings 200) to from an accommodation space to accommodate foreign matter.

According to an example, the image forming device may include a plurality of developing devices 2. The plurality of developing devices 2 may be detachably attached to a body 1. The body 1 is provided with an exposure device 13, a transfer device, and a fusing device 15. The body 1 is also provided with a printing medium conveying unit to load and convey the printing medium P on which an image is to be formed. For color printing, the plurality of developing devices 2 may include four developing devices 2 to develop images of, for example, cyan (C), magenta (M), yellow (Y), and black (K) colors. The four developing devices 2 may contain developers of C, M, Y, and K colors, respectively, for example, toners. Although not shown in the drawings, the toners of C, M, Y, and K colors may be accommodated in four toner supply containers, respectively, and the toners of C, M, Y, and K colors may be supplied from the four toner supply containers to the four developing devices 2, respectively. The image forming device may further include the developing device 2 to accommodate and develop toners of various colors, such as light magenta and white colors, in addition to the above-described colors. Hereinafter, the image forming device including the four developing devices 2 will be described. Unless otherwise specified, reference numerals attached with C, M, Y, and K refer to components to develop images of C, M, Y, and K colors, respectively. The developing device 2 according to an example is an integrated developing device. Developing devices 2C, 2M, 2Y, and 2K may be detachably attached to the body 1 through a door (not shown). The developing device 2 may include a photosensitive unit 2-1 and a developing unit 2-2.

The photosensitive unit 2-1 includes the photosensitive drum 21. The photosensitive drum 21 is an example of a photoconductor, on a surface of which an electrostatic latent image may be formed, and may include a conductive metal pipe and a photosensitive layer on an outer circumference thereof. A charging roller 23 is an example of a charging device to charge the photosensitive drum 21 to have a uniform surface electric potential. Instead of the charging roller 23, a charging brush, a corona charger, or the like may be employed. The photosensitive unit 2-1 may further include a cleaning roller (not shown) to remove foreign matter adhering to a surface of the charging roller 23. A cleaning blade 25 is an example of a cleaning member to remove toner and foreign matter remaining on a surface of the photosensitive drum 21 after a transfer process, which will be described later. Instead of the cleaning blade 25, a cleaning member of another type such as a rotating brush may be employed. Hereinafter, the toner and the foreign matter removed from the photosensitive drum 21 by the cleaning blade 25 are referred to as a waste toner. The waste toner may be accommodated in a waste toner accommodation portion 26.

The developing unit 2-2 may include a toner accommodation portion 29. The developing unit 2-2 is to supply a toner accommodated in the toner accommodation portion 29 to the electrostatic latent image formed on the photosensitive drum 21 to develop the electrostatic latent image into a visible toner image. For a developing method, there may be a one-component developing method that uses a toner, and a two-component developing method that uses a toner and a carrier. The developing device 2 according to an example employs the one-component developing method but is not limited thereto. A developing roller 22 is to attach the toner to its outer circumference to supply the toner to the photosensitive drum 21. A developing bias voltage to supply the toner to the photosensitive drum 21 may be applied to the developing roller 22. According to an example, a contact developing method in which the developing roller 22 and the photosensitive drum 21 are in contact with each other to form a developing nip N is employed. A supply roller 27 is to supply the toner in the toner accommodation portion 29 to a surface of the developing roller 22. To that end, a supply bias voltage may be applied to the supply roller 27. The developing unit 2-2 may further include a regulation member 28 to regulate an amount of the toner supplied to the developing nip N in which the photosensitive drum 21 and the developing roller 22 are in contact with each other. The regulation member 28 may include, for example, a blade to elastically contact a surface of the developing roller 22 to regulate an amount of toner attached to the outer circumference of the developing roller 22.

The exposure device 13 is to irradiate the photosensitive drum 21 with light modulated corresponding to image information to form the electrostatic latent image on the photosensitive drum 21. For the exposure device 13, a laser scanning unit (LSU) using a laser diode as a light source, a light emitting diode (LED) exposure device using an LED as a light source, or the like may be employed.

The transfer device may include the intermediate transfer belt assembly 6 and a transfer roller 66. The intermediate transfer belt assembly 6 is the same as the description given in FIGS. 1 to 12. The toner images developed on the photosensitive drums 21 of the developing devices 2C, 2M, 2Y, and 2K, respectively, may be temporarily transferred onto the intermediate transfer belt 60. The intermediate transfer belt 60 may be supported by the support rollers 62 and 63, and the tension roller 64, and run along a circulation path. The four intermediate transfer rollers 61 may be arranged at positions facing the photosensitive drum 21*s* of the developing devices 20, 2M, 2Y, and 2K, respectively, with the intermediate transfer belt 60 interposed therebetween. In a case where the intermediate transfer roller 61 is located in a pressed position, the gap ring 200 comes into contact with the photosensitive drum 21 to maintain an interval between the photosensitive drum 21 and the intermediate transfer roller 61. An intermediate transfer bias voltage to intermediately transfer the toner images developed on the photosensitive drums 21 onto the intermediate transfer belt 60 may be applied to the four intermediate transfer rollers 61. The transfer roller 66 faces the intermediate transfer belt 60. For example, the transfer roller 66 faces the support roller 63 with the intermediate transfer belt 60 interposed therebetween. An elastic member 67 may press the transfer roller 66 toward the support roller 63 to form a transfer nip. A transfer bias voltage to transfer the toner images intermediately transferred onto the intermediate transfer belt 60 onto the printing medium P may be applied to the transfer roller 66.

In a case where a print command is received from a host (not shown) or the like, a controller (not shown) may use the charging roller 23 to charge a surface of the photosensitive drum 21 to a uniform electric potential. The exposure device 13 may scan four light beams modulated in accordance with the image information of the four colors to the photosensitive drums 21 of the developing devices 2C, 2M, 2Y, and 2K, respectively, to form the electrostatic latent images on the photosensitive drums 21. The developing roller 22 of the developing devices 20, 2M, 2Y, and 2K may supply the C, M, Y, and K toners to the corresponding photosensitive drums 21, respectively, to develop the electrostatic latent image into the visible toner image. The developed toner images may be superimposed and transferred onto the intermediate transfer belt 60. The printing medium P loaded on a loading table 17 may be drawn out one by one by a pickup roller 16, and conveyed to the transfer nip formed by the transfer roller 66 and the intermediate transfer belt 60 by a feed roller 18. The toner images superimposed on the intermediate transfer belt 60 may be transferred onto the printing medium P by the transfer bias voltage applied to the transfer roller 66. In a case where the printing medium P passes through the fusing device 15, the toner images may be fused onto the printing medium P by heat and pressure. The fused printing medium P may be discharged to the outside by a discharge roller 19.

The developing device 2 may be located above the intermediate transfer belt assembly 6 with regard to a direction of gravity. The developing roller 22 may be partially exposed to the outside through a developing opening provided in a developing device housing 24. A gap between the developing roller 22 and the developing device housing 24 may be sealed by a sealing structure (not shown), but sealing between an end portion of the developing roller 22 in a longitudinal direction and the developing device housing 24 may allow for leakage. Therefore, the toner may leak out through an end portion of the developing roller 22 in the longitudinal direction. Since the developing device 2 is located above the intermediate transfer belt assembly 6, the toner leaking out of the developing device 2 falls onto the intermediate transfer belt assembly 6 through gravity. The toner leaking out of a developing device mainly falls to a vicinity of the gap ring 200. The toner leaking out of the developing device may contaminate the roller portion 61-1 of the intermediate transfer roller 61 and the intermediate transfer belt 60, thereby degrading a transfer quality. While the image forming device operates, a flow of air may occur in the body 1, and the toner leaking out of the developing device may scatter in the image forming device body 1 to contaminate parts in the body 1, or may leak out of the body 1 through an air vent provided in the body 1.

In an example, the image forming device includes the accommodation portion 630 including the plurality of inlets 631 located in lower portions of the plurality of gap rings 200 (e.g., below the plurality of gap rings 200). The toner falling out of the developing device 2 may pass through the plurality of inlets 631 to be accommodated in the accommodation space in the accommodation portion 630. Therefore, the contamination of the intermediate transfer roller 61 and the intermediate transfer belt 60 due to the leaking toner may be decreased, and the degradation of the transfer quality may be reduced or prevented. In addition, scattered toner may be prevented from leaking out of the body 1. The shutter 700 selectively opens or closes the inlet 631 of the accommodation portion 630. For example, in a case where the intermediate transfer roller 61 is located in the pressed position, that is, in a case where a print operation is performed, the shutter 700 is located in an open position to open the inlet 631 of the accommodation portion 630. The shutter 700 is located in a closed position to block the inlet 631 of the accommodation portion 630 in a case where the intermediate transfer roller 61 is located in a released position, that is, in a case where the print job is not performed. Given such a configuration, foreign matter accommodated in the accommodation portion 630 may be prevented from leaking out of the accommodation portion 630. In addition, since the shutter 700 is switched between the open position and the closed position in conjunction with a movement of the intermediate transfer roller 61 to the pressed position or the released position, an additional actuator to drive the shutter 700 may be omitted.

It should be understood that examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. An intermediate transfer belt assembly comprising:
an intermediate transfer belt;
an intermediate transfer roller located on an inner side of the intermediate transfer belt to support the intermediate transfer belt;
an accommodation portion to accommodate foreign matter, the accommodation portion having an inlet open toward the intermediate transfer belt; and
a shutter to open or close the inlet,
wherein the shutter is located in a closed position when an image-forming operation using the intermediate transfer belt is not performed,
wherein the shutter is configured to automatically move to the closed position in response to completion or stopping of an image-forming operation using the intermediate transfer belt, while the intermediate transfer roller remains positioned on the inner side of the intermediate transfer belt.

2. The intermediate transfer belt assembly of claim 1, further comprising an elastic member to apply an elastic force to the shutter to open the inlet.

3. The intermediate transfer belt assembly of claim 1,
wherein the intermediate transfer roller is movable between a pressed position to press the intermediate transfer belt outward and a released position to release a pressing force, and
wherein the shutter is further to switch between an open position to open the inlet and the closed position to close the inlet in conjunction with a movement of the intermediate transfer roller between the pressed position and the released position.

4. The intermediate transfer belt assembly of claim 3, further comprising an elastic member to apply an elastic force to the shutter to switch the shutter to the open position while the intermediate transfer roller moves from the released position to the pressed position.

5. The intermediate transfer belt assembly of claim 3, further comprising:
a support member; and
a holder coupled to the support member to be rotated between the pressed position and the released position and to support one end portion of the intermediate transfer roller to be rotated,
wherein the holder is further to interfere with the shutter while rotating between the open position and the released position to switch the shutter between the open position and the closed position.

6. The intermediate transfer belt assembly of claim 5, further comprising:
a slider connected to the holder and supported by the support member to slide between a first position to locate the holder to the pressed position and a second position to locate the holder to the released position; and
a rotation cam to slide the slider between the first position and the second position.

7. The intermediate transfer belt assembly of claim 1, further comprising a gap ring coupled to one end portion of the intermediate transfer roller to be rotated,
wherein the inlet is provided in a lower portion of the gap ring.

8. The intermediate transfer belt assembly of claim 1, further comprising a plurality of intermediate transfer rollers, a plurality of inlets, and a plurality of shutters.

9. The intermediate transfer belt assembly of claim 8, further comprising the plurality of intermediate transfer rollers, the plurality of inlets, and the shutter further to open or close the plurality of inlets.

10. An image forming device comprising:
a plurality of photosensitive drums on which toner images are to be formed;
an intermediate transfer belt onto which the toner images are to be transferred;
a plurality of intermediate transfer rollers respectively facing the plurality of photosensitive drums with the intermediate transfer belt interposed therebetween;

a plurality of gap rings respectively coupled to end portions of the plurality of intermediate transfer rollers to be rotated to maintain intervals between the plurality of photosensitive drums and the plurality of intermediate transfer rollers;

a frame provided with an accommodation portion to accommodate foreign matter and having a plurality of inlets located on lower portions of the plurality of gap rings, wherein the frame is to support the plurality of intermediate transfer rollers to be rotated; and a shutter to open or close the plurality of inlets, wherein the shutter is located in a closed position when an image-forming operation using the intermediate transfer belt is not performed.

11. The image forming device of claim 10, wherein the intermediate transfer roller is movable between a pressed position to press the intermediate transfer belt outward and a released position to release a pressing force, and wherein the shutter is to switch between an open position to open the inlet and the closed position to close the inlet in conjunction with a movement of the intermediate transfer roller between the pressed position and the released position.

12. The image forming device of claim 11, further comprising an elastic member to apply an elastic force to the shutter to switch the shutter to the open position in a case where the intermediate transfer roller moves from the released position to the pressed position.

13. The image forming device of claim 11, further comprising a holder coupled to the frame to be rotated between the pressed position and the released position and to support one end portion of the intermediate transfer roller to be rotated, wherein the holder is further to interfere with the shutter while rotating between the pressed position to the released position to switch the shutter between the open position and the closed position.

14. The image forming device of claim 13, further comprising:

a slider connected to the holder and supported by the frame to slide between a first position to locate the holder in the pressed position and a second position to locate the holder in the released position; and a rotation cam to slide the slider between the first position and the second position.

15. The image forming device of claim 10, wherein the shutter comprises a plurality of shutters respectively corresponding to the plurality of inlets.

* * * * *